May 30, 1939.　　　W. F. GROENE　　　2,160,402
CRANKSHAFT LATHE
Filed June 14, 1937　　　3 Sheets-Sheet 1
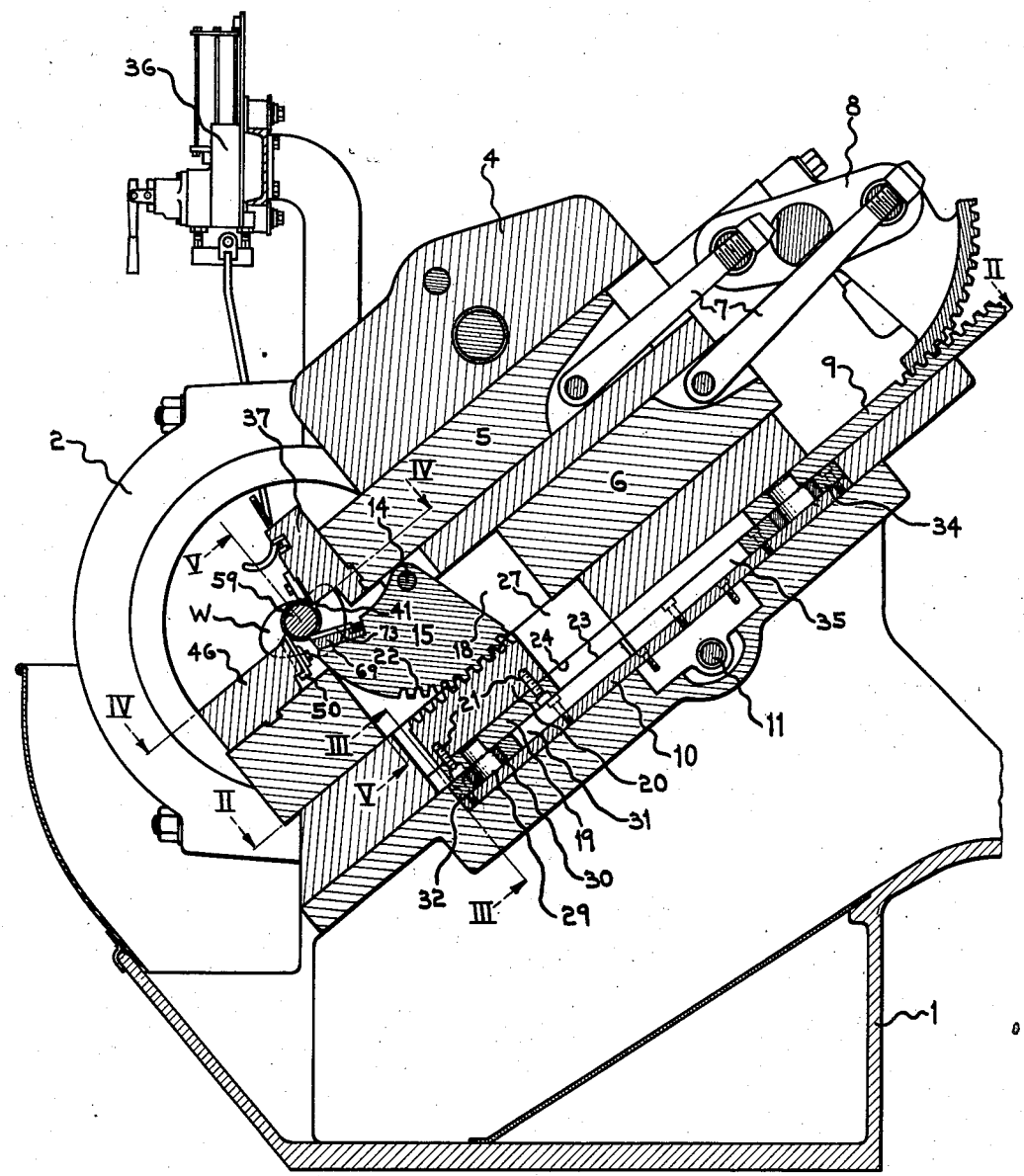
FIG. I
INVENTOR.
WILLIAM F. GROENE
BY Willard L. Groene
ATTORNEY.

May 30, 1939.　　　W. F. GROENE　　　2,160,402
CRANKSHAFT LATHE
Filed June 14, 1937　　　3 Sheets-Sheet 2
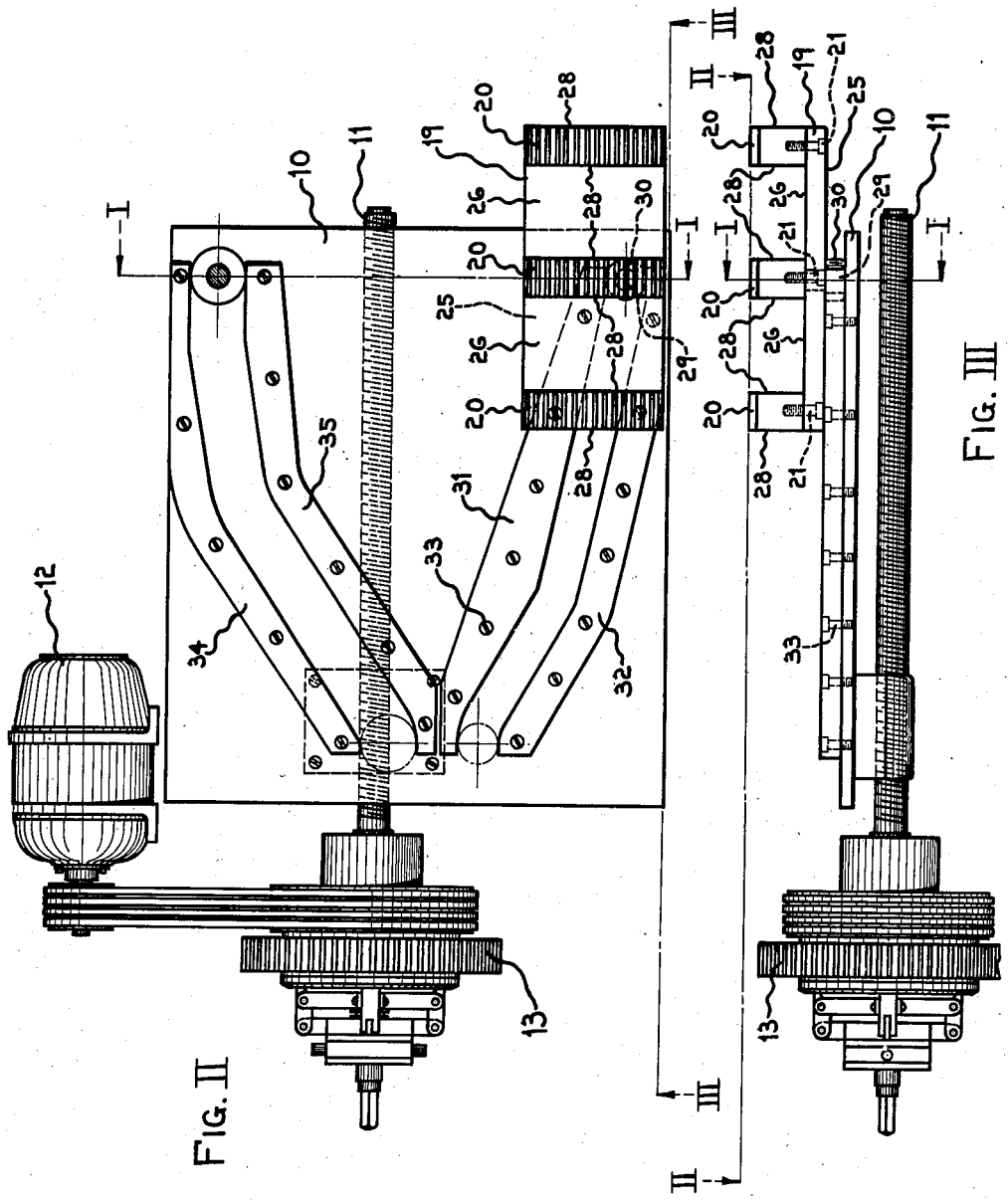
INVENTOR.
WILLIAM F. GROENE
BY Willard S. Groene
ATTORNEY.

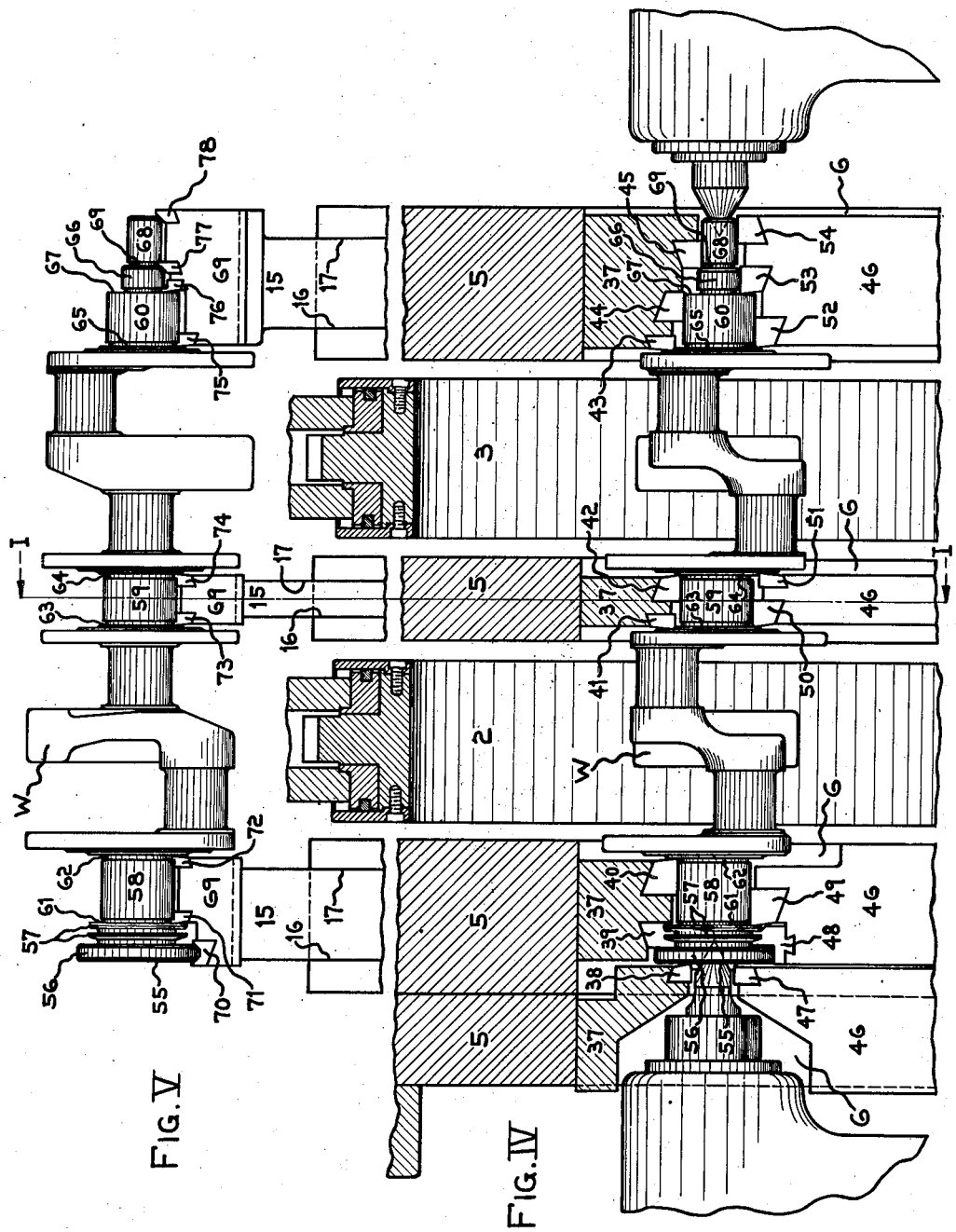

Patented May 30, 1939

2,160,402

UNITED STATES PATENT OFFICE 2,160,402

CRANKSHAFT LATHE

William F. Groene, Cincinnati, Ohio, assignor to The R. K. Le Blond Machine Tool Company, Cincinnati, Ohio, a corporation of Delaware Application June 14, 1937, Serial No. 148,099

16 Claims. (Cl. 82—9)

This invention pertains to lathes and more particularly to certain improvements and new additions to crankshaft lathes of a character fully set forth in Patent 2,069,107 of William F. Groene and Walter R. Meyer dated January 26, 1937. Heretofore in lathes of this type it has been customary to utilize the same cutting tools for both roughing and finishing operations. Because of the rapid production of these machines considerable difficulty has been encountered in that these tools do not maintain sufficient sharpness due to the rapid rough turning operations to give proper finished turned dimensions on the work without frequent grinding and the consequent frequent shutting down of the lathe resulting in serious impairment of the productive efficiency of the lathe. In former machines it has also been found impractical to finish face and neck the fillets adjacent line bearings and related bearing surfaces of crankshafts with the same cutting tools employed for roughing these portions, the accuracy of these finish machining operations being extremely vital to the proper and efficient carrying out of subsequent grinding and straightening operations on the crankshafts. In order to overcome these difficulties in the past one machine was used for roughing and one or more machines were utilized to complete the finishing operations on these line bearing portions of the shaft in order to properly prepare the work for subsequent grinding operations.

It occurred to me that this large investment in equipment and the incident overhead connected therewith could be greatly decreased if a single machine could be arranged to do roughing and finishing operations with different sets of cutting tools. With this in mind I conceived the idea of having a set of finishing tools operating simultaneously with the roughing tools formerly used in a lathe as set forth in the above-mentioned patent to thereby accomplish in a single machine what had formerly required two or more machines.

An object of my invention is to provide tool feeding devices for operating upon a work piece in the lathe in addition to the opposed tool feeding devices of the above mentioned patent.

Anothr object is to provide in a crankshaft lathe oppositely moving tool feeding devices for roughing out portions on said crankshaft and to provide additional tool feeding devices moving in a different direction from said first mentioned tool feeding devices for finishing portions on said crankshaft.

Still another object is to provide in a lathe cutting tools adapted to be fed relative to and from opposite sides of a work piece, to provide additional cutting tools adapted to be fed relative to said work piece in an arcuate path, and to provide appropriate means for feeding said tools in a predetermined sequence for machining surfaces on said work piece.

It is also an object of my invention to provide in a lathe adapted to simultaneously machine the flange and stub ends and all of the line bearings of a crankshaft a plurality of series of cutting tools operable simultaneously, some adapted to rough machining operations and others adapted to finish machining operations whereby a crankshaft may be completely machined in said lathe with a single chucking of said crankshaft.

Further objects and advantages of my invention will be set forth in the description of the drawings in which:

Figure I is a vertical transverse section on the line I—I of Figure II, III, IV, and V, particularly showing the various cutting tool feeding devices and the actuating mechanism therefor.

Figure II is a view on the line II—II of Figures I and III, particularly showing the cam feeding mechanism for actuating the tool feeding devices.

Figure III is a view along the line III—III of Figures I and II.

Figure IV is a diagrammatic view approximately on the line IV—IV of Figure I to particularly show the relationship of the roughing tools to the crankshaft and the nature of the machining operations performed thereon.

Figure V is a diagrammatic view approximately on the line V—V of Figure I to particularly show the relationship of the finishing tools to the crankshaft and the nature of the machining operations performed thereon.

The invention is shown applied to a double center drive lathe having a base 1 upon which are mounted the center drive chucks 2 and 3 and the tool carrying units 4 in which are slidably mounted the tool bars 5 and 6 adapted to be actuated in opposite directions by the connecting rods 7 attached to the feed crankshaft 8 which is rocked by the rack bar 9 upon movement of the cam plate 10 when actuated by the screw 11 in the manner fully set forth in Patent 2,069,107 mentioned above; the tool bars being actuated in rapid traverse movements by the rapid traverse motor 12 and in feeding movements by appropriately rotating the gear 13 as fully set forth in said patent.

Pivotally mounted on the pin 14 fixed in the tool carrying units 4 are the tool holders 15 which are guided against axial movement of the pin 14 by the faces 16 and 17 of the slots 18 formed in the tool bars 6. The tool holders 15 are actuated in swinging movement by means of the cam bar 19 which has racks 20 fixed thereon by suitable screws 21 which engage the segmental gear teeth 22 formed on the tool holder 15. The assembly of the cam bar 19 and racks 20 is guided for sliding movement perpendicular to the axis of the pin 14 by the surface 23 of the base 1 and the surface 24 of the unit 4 engaging surfaces 25 and 26 respectively of the cam bar 19 and the sides of the slots 27 formed in the unit 4 engaging the sides 28 of the racks 20. Fixed in the cam bar 19 is a stud 29 having a roller 30 which is engaged by appropriate cams 31 and 32 fixed on the cam plate 10 by suitable screws 33. It can thus be seen that upon moving the cam plate 10 for actuating the tool bars 5 and 6 the tool holder 15 may be also actuated in swinging movement relative to the crankshaft W held in the center drive chucks 2 and 3. The cams 31 and 32 and the cams 34 and 35 on the cam plate 10 can obviously be so arranged as to actuate all the tool feeding devices 5, 6, and 15 in any desired predetermined sequence. These cams are also so arranged as to fully retract these tool feeding devices to permit free access to the center drive chucks 2 and 3 for loading and unloading the work W by means of the usual loading device 36.

Referring to Figure IV, on the tool bars 5, are mounted appropriate tool blocks 37 carrying the tools 38, 39, 40, 41, 42, 43, 44, and 45, and on the tool bars 6 are mounted appropriate tool blocks 46 carrying the tools 47, 48, 49, 50, 51, 52, 53, and 54. Tool 47 rough turns the outside face 55 of the flange 56, the tool 38 finish turns the outside face of said flange. Tools 39 and 48 finish the oil slinger 57, the tool 48 also finishing the diameter of the flange 56. Tools 40—49, 42—50, 44—52 finish turn the respective line bearings 58, 59, and 60 and rough turn the fillets 61—62, 63—64, and 65 respectively associated therewith. Tools 41, 51 and 43 finish cheek the webs adjacent the line bearings 59 and 60. Tool 53 finish turns the gears fit 66 and rough faces the shoulder 67 adjacent thereto. Tools 45 and 54 finish turn the stub end 68, tool 45 rough facing the adjacent shoulder 69.

Referring to Figure V, on the tool holders 15 are mounted appropriate tool blocks 69 carrying the tools 70, 71, 72, 73, 74, 75, 76, 77, and 78. The tool 70 chamfers the diameter of the flange 56. The tools 71—72, 73—74, and 75 finish face and neck the respective fillets 61—62, 63—64, and 65 of the respective line bearings 58, 59, and 60. The tool 76 finish faces and necks the shoulder 67, the tool 77 finish faces and necks the shoulder 69 and the tool 78 chamfers the stub end 68.

Preferably in the operation of the lathe the cams 31—32, and 34—35 are so designed as to cause the tools on the bars 5 and 6 to complete their turning operations and enter dwell before the tools on the tool holders 5 complete their work so that no heavy cutting is undertaken by these latter tools which would impair their accuracy for the necessary finish turning operations required on the crankshaft to prepare it properly for subsequent grinding operations.

Having fully set forth and described my invention, what I claim and desire to secure by United States Letters Patent is:

1. In a tool feeding means for a lathe, a housing, tool bars slidable in said tool carrying unit, tools on said tool bars, cam means to produce oppositely directed motion of said bars, a tool holder pivotally mounted on said tool carrying unit, tools on said tool holder, cam means for swinging said tool holder, and means for operating said cam means.

2. In tool feeding means for a lathe, a housing, tool bars slidable in said tool carrying unit, tools on said tool bars, cam means to produce oppositely directed motion of said bars, a tool holder pivotally mounted on said tool carrying unit, tools on said tool holder, cam means for swinging said tool holder, and common means for operating said cam means for simultaneously actuating said tool bars and tool holder in a predetermined cycle of operation.

3. In a crankshaft lathe, a base, means thereon to support and revolve a crankshaft intermediate its ends, tool carrying units associated with said means, tool bars slidable in said units, tools on said tool bars, cam means to produce oppositely directed motion of said bars, tool holders pivotally mounted on said units, tools on said tool holders, cam means for swinging said tool holders, and means for operating said cam means to actuate said tool bars and tool holders for machining the stub end, flange end, and line bearings of said crankshaft.

4. In a lathe, a base, a rotatable work holder mounted on said base, a pair of tool slides operable each side of the axis of rotation of said work holder adapted to feed cutting tools from opposite directions relative to a work piece in said work holder, means for simultaneously reciprocating said tool slides, a third tool holder movable relative to the axis of rotation of said work holder in a direction to move a cutting tool substantially perpendicular to the direction of movement of said first mentioned tool slides, means for moving said second mentioned tool holder, common means interconnecting the means for reciprocating and moving said tool slides and tool holder, and power means for actuating said last mentioned means so as to simultaneously move all of said cutting tools relative to a work piece in said work holder.

5. In a lathe, a rotatable work holder, a tool carrier unit associated with said work holder, a pair of tool bars mounted for reciprocation in opposite directions in said unit, tools on said tool bars adapted to approach a work piece in said work holder from diametrically opposite directions, a third tool holder movably mounted in said unit, a tool carried in said tool holder, common means for simultaneously reciprocating said tool bars and said tool holder to cause movement of their respective tools relative to a work piece in said work holder, and power means for operating said last mentioned common means.

6. In a lathe, a base, a rotatable work holder mounted on said base, a tool carrier unit mounted on said base and associated with said work holder, a pair of reciprocatable tool bars mounted in said unit, cutting tools mounted on said tool bars for movement relative to the axis of rotation of the work piece in said work holder from diametrically opposite directions, a feed crankshaft carried in said unit, connecting rods connecting said tool bars to the throws of said feed crankshaft, a third tool holder movably mounted in said unit, a tool in said tool holder adapted to move relative to the axis of rotation of the work piece in said work holder in a direction substantially perpendicular to the direction of feeding of said first mentioned tools, means for actuating said third tool holder, common means for actuating said last mentioned means and rocking said feed crankshaft, and power means for actuating said common means.

7. In a lathe, a base, a rotatable work holder mounted on said base, a tool carrier unit mounted on said base and associated with said work holder, a pair of oppositely reciprocatable tool bars slidably mounted in said unit, cutting tools mounted on the ends of said tool bars for movement relative to a work piece in said work holder from diametrically opposite directions, a feed crankshaft carried by said unit, connecting rods interconnecting the throws of said feed crankshaft with said tool bars, a third tool holder movably mounted in said unit, a cutting tool mounted in said holder for movement relative to said work piece in a direction substantially perpendicular to the movement of said tool bars, rack and pinion means for actuating said feed crankshaft and said third tool holder, common means for actuating said rack and pinion means, and power means for operating said last mentioned means.

8. In a lathe, a base, a rotatable work holder mounted on said base, a tool carrier unit mounted on said base and associated with said work holder, a pair of oppositely reciprocatable tool bars slidably mounted in said unit, cutting tools mounted on the ends of said tool bars for movement relative to the work piece in said work holder from diametrically opposite directions, a feed crankshaft mounted in said unit, connecting rods interconnecting said tool bars with the throws of said feed crankshaft, a third tool holder movably mounted in said unit, a cutting tool mounted on said holder adapted to move relative to a work piece in said work holder in a direction substantially perpendicular to that of the movement of said tool bars, rack and pinion means for actuating said feed crankshaft and said third tool holder, cam means for operating said rack and pinion means, common means for actuating said cam means, and power means for operating said last mentioned means.

9. In a lathe, a base, a rotatable work holder mounted on said base, a tool carrier unit mounted on said base and associated with said work holder, a pair of oppositely reciprocatable tool bars slidably mounted in said unit, cutting tools mounted on the ends of said tool bars for relative approach to a work piece in said work holder from opposite directions, a feed crankshaft mounted in said unit, connecting rods interconnecting said tool bars with the throws of said feed crankshaft, a third tool holder movably mounted in said unit, a tool mounted in said tool holder adapted to be moved relative to a work piece in said work holder in a direction substantially perpendicular to that of the movement of said tool bars, rack and pinion means for actuating said feed crankshaft and said third tool holder, cam means for operating said rack and pinion means at a plurality of different rates of speeds, common means for actuating said cam means, and power means for operating said last mentioned means.

10. In a lathe, a base, a rotatable work holder mounted on said base, a tool carrier unit mounted on said base and associated with said work holder, a pair of oppositely reciprocatable tool bars slidably mounted in said unit, cutting tools mounted on the ends of said tool bars for movement relative to a work piece in said work holder from opposite directions, a feed crankshaft mounted in said unit, connecting rods interconnecting said tool bars with the throws of said feed crankshaft, a third tool holder pivotally mounted in said unit, a cutting tool mounted on said holder for movement relative to said work piece in said work holder in a direction substantially perpendicular to that of the direction of movement of said tool bars, rack and pinion means for actuating said feed crankshaft, cam means for operating said rack and pinion means at a plurality of different speeds, rack and pinion means for actuating said third tool holder, cam means for actuating said second mentioned rack and pinion means at a plurality of different speeds, common means for simultaneously actuating both of said cam means, and power means for actuating said last mentioned means.

11. In a crankshaft lathe, a base, means on said base for supporting and rotating a crankshaft intermediate its ends, tool carrier units associated with said supporting and rotating means and mounted on said base, oppositely reciprocatable tool bars mounted in said unit, cutting tools carried on the ends of said tool bars for relative approach to said crankshaft from diametrically opposite directions, means for simultaneously actuating said tool bars carried by said tool units, a third series of tool holders movably mounted in said tool units, tools mounted on said tool holders for relative approach to said work piece from a direction different from the direction of movement of said tool bars, means for simultaneously actuating all of said third tool holders, common means for actuating the actuating means for said tool bars and said third tool holders, and power means for actuating said last mentioned means.

12. In a crankshaft lathe, a base, means for supporting and rotating a crankshaft intermediate its ends, tool carrier units mounted on said base and associated with said supporting and rotating means, oppositely reciprocatable tool bars slidably mounted in said units, cutting tools mounted on the ends of said tool bars for relative movement to and from the line bearings and flange and stub ends of said crankshaft for roughing said portions, means carried by said units for simultaneously actuating all of said tool bars, a series of third tool holders movably mounted in said units, for movement relative to the line bearings and flange and stub ends of said crankshaft, cutting tools mounted on said tool holders adapted to finish machine portions of said line bearings and flange and stub ends, means carried in the base of said lathe for simultaneously operating the means for actuating said tool bars and said series of third tool holders, and power means for actuating said last mentioned means.

13. In a crankshaft lathe, a base, means for supporting and rotating a crankshaft mounted on said base, tool carrier units associated with said supporting and rotating means and mounted on said base, pairs of oppositely reciprocatable tool bars slidably mounted in said units, means carried by said unit for simultaneously reciprocating all of said tool bars, cutting tools mounted on the ends of said tool bars adapted to approach a crankshaft in said lathe from diametrically opposite directions, a series of third tool holders carried in said tool carrier units adapted to move in a direction substantially different from that of said tool bars, cutting tools mounted on said tool holders adapted to engage portions of said crankshaft associated with portions engaged by the tools carried by said tool bars, common means for simultaneously actuating said tool bars and said series of third tool holders, and power means for operating said last mentioned means.

14. In a crankshaft lathe, a base, one or more center drive chucking devices mounted on said base, centers associated with said center drive chucking devices, tool carrier units associated with said center drive chucking devices and centers, pairs of reciprocatable tool bars mounted in said units, means carried by said units for simultaneously oppositely reciprocating said tool bars in said units, cutting tools carried on the ends of said tool bars for relative approach to a crankshaft in said lathe, a third series of tool holders movably mounted in said units, cutting tools in said third tool holders adapted to approach said crankshaft from a direction different from that of the direction of approach of the tools mounted on said tool bars, common means for actuating said tool bars and said third series of tool holders, and power means for actuating said last mentioned means.

15. In a crankshaft lathe, a base, center drive chucking devices mounted on said base, centers associated with said center drive chucking devices, tool carrier units associated with said center drive chucking devices and centers, pairs of oppositely reciprocatable tool bars slidably mounted in said units, cutting tools mounted on the ends of said tool bars for movement relative to the work crankshaft in said lathe from diametrically opposite positions, a feed crankshaft carried in said units, connecting rods interconnecting said tool bars with the throws of said feed crankshaft, a series of third tool holders pivotally mounted in said unit, cutting tools mounted on said third tool holders adapted to approach said work crankshaft from a direction substantially different from that of the direction of relative approach of said tools carried by said tool bars, rack and pinion feed mechanism for actuating said feed crankshaft and said third tool holders, and common means for rendering said rack and pinion mechanism operable.

16. In a crankshaft lathe, a base, center drive chucking devices mounted on said base, centers associated with said center drive chucking mechanisms, tool carrier units associated with said center drive chucking mechanisms and centers mounted on said base, pairs of oppositely reciprocatable tool bars slidably mounted in said units, a feed crankshaft carried by said units, connecting rods interconnecting said tool bars with the throws of said feed crankshaft, cutting tools mounted on the ends of said tool bars for relative approach to said work crankshaft in said lathe from diametrically opposite directions, a series of third tool holders pivotally mounted in said units, cutting tools in said third tool holders adapted to move relative to said work crankshaft from a direction substantially different from the direction of movement of said tools on said tool bars, rack and pinion means for actuating said feed crankshaft and said third tool holders, cam means for operating said rack and pinion means at a plurality of different speeds, and common means for operating said cam means.

WILLIAM F. GROENE.